US010708845B2

(12) United States Patent
Bencheikh et al.

(10) Patent No.: US 10,708,845 B2
(45) Date of Patent: Jul. 7, 2020

(54) BACKHAUL SELECTION IN A WIRELESS NETWORK

(71) Applicant: CHARTER COMMUNICATIONS OPERATING, LLC, Saint Louis, MO (US)

(72) Inventors: Ahmed Bencheikh, Lorton, VA (US); Muhammad Gill, Allen, TX (US); Haider H. Syed, Parker, CO (US); Manoj K. Das, Centennial, CO (US); Perwaiz Akhtar, Aurora, CO (US); Vijay K. Mechineni, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/103,662

(22) Filed: Aug. 14, 2018

(65) Prior Publication Data
US 2020/0059849 A1 Feb. 20, 2020

(51) Int. Cl.
*H04W 40/22* (2009.01)
(52) U.S. Cl.
CPC ................... *H04W 40/22* (2013.01)
(58) Field of Classification Search
None
See application file for complete search history.

(56) References Cited

U.S. PATENT DOCUMENTS 7,933,612 B2 * 4/2011 Counts ................. G01S 5/0252
455/456.1
2011/0164593 A1 * 7/2011 Huet ................. H04W 36/0055
370/333

* cited by examiner

*Primary Examiner* — Mohammed Rachedine
(74) *Attorney, Agent, or Firm* — Armis IP Law, LLC

(57) ABSTRACT

According to one configuration, an example communication system includes a primary wireless station, multiple candidate wireless stations, and a remote network. The primary wireless station is in communication with one or more of the multiple candidate wireless stations. During operation, when the primary wireless station needs to provide one or more communication devices access to a remote network, the primary wireless station monitors presence of the multiple candidate wireless stations. Each of the multiple candidate wireless stations is available to support a wireless backhaul link from the primary wireless station to a remote (such as a core) network. The primary wireless station is operable to select an appropriate candidate wireless station amongst the multiple candidate wireless stations. Via the selected candidate wireless station, the primary wireless station establishes a backhaul link to the remote network.

26 Claims, 11 Drawing Sheets

| WIRELESS STATION | CANDICATE BACKHAUL | PERFORMANCE INFO 310 | | |
|---|---|---|---|---|
| | | DOWNLINK BANDWIDTH (MBPS) | UPLINK BANDWIDTH (MBPS) | LATENCY (MILLISECONDS) |
| W.S. 131 | CAND. BACKHAUL 141 | 40 | 10 | 20 |
| W.S. 132 | CAND. BACKHAUL 142 | 30 | 10 | 100 |
| W.S. 133 | CAND. BACKHAUL 143 | 100 | 40 | 15 |
| W.S. 134 | CAND. BACKHAUL 144 | 10 | 15 | 250 |
| W.S. 135 | CAND. BACKHAUL 145 | 0 | 0 | N/A |
| ⋮ | | | | |

FIG. 7

BACKHAUL SELECTION IN A WIRELESS NETWORK

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a system uses one or more wireless channels allocated from a CBRS (Citizens Band Radio Service) to support communications with one or more mobile communication devices. Typically, one or more wireless channels is allocated to a base station by a SAS (Spectrum Access Service) to support communications with one or more mobile communication devices. For example, a base station can be configured to communicate with the SAS to receive notification of the wireless channel allocated for use. SAS communications as well as the data used by Mobile devices transmitted by the base station are transported over a respective Backhaul. User plane data, control plane data, Management traffic and communication with SAS carried over the Backhaul connection with the Radio base station.

Via a communication link such as a backhaul link between the base station and a remote network, the base station provides the one or more mobile communication devices access to a remote network. In other words, in an uplink direction, the base station forwards communications over a backhaul link to target recipients in the remote network. In a reverse direction, such as a downlink direction, the base station receives communications from the remote network over a backhaul link and wirelessly conveys received communications to respective target recipients.

BRIEF DESCRIPTION OF EMBODIMENTS

There are deficiencies associated with conventional techniques of providing a static backhaul to couple a respective base station to a remote network. For example, the backhaul may experience congestion in which it is no longer able to convey communications and desired bandwidth. Additionally, a backhaul may no longer be operable due to a failure condition. In such an instance, a wireless station will not be able to provide communication devices access to a remote network.

Embodiments herein provide novel ways of providing improved wireless communications to one or more mobile communication devices via selection and use of an appropriate backhaul link to a remote network. More specifically, in one embodiment, a wireless communication system includes hardware or software resources (or a combination of both) in which to dynamically select an appropriate backhaul for use by a respective wireless station.

An example communication system according to embodiments herein includes a primary wireless station, multiple candidate wireless stations (in which to establish a backhaul), and a remote network. Each of the multiple candidate wireless stations can be configured to support a different wireless communication protocol, different carrier frequency, etc., to support wireless communications over a backhaul communication link established with the primary wireless station.

The primary wireless station is potentially in wireless communication or intends to be in communication with one or more of the multiple candidate wireless stations. To provide wireless connectivity, the primary wireless station selects a backhaul to a remote network. To select a backhaul and provide one or more communication devices access to a remote network, the primary wireless station monitors for presence of multiple candidate wireless stations. This can include generating one or more discovery requests, prompting any wireless stations to respond with presence information. Additionally, or alternatively, the primary wireless station can be configured to listen for presence of one or more beacons indicating presence and/or availability of the different wireless stations.

In one embodiment, each of the multiple candidate wireless stations is available to support a wireless backhaul link from the primary wireless station to a remote network (such as a core network). In one embodiment, the primary wireless station is operable to select an appropriate candidate wireless station amongst the multiple candidate wireless stations based on specific needs of the wireless communication devices supported by primary wireless station. After selection, the primary wireless station communicates using a respective communication interface to the selected candidate wireless station to establish a backhaul link to the remote network.

In accordance with further embodiments, as previously discussed, the primary wireless station monitors the network environment. In one embodiment, the primary wireless station initiates testing of the available candidate wireless stations prior to selection of a backhaul. According to one configuration, when monitoring the network environment for candidate wireless stations, the primary wireless station: i) receives a first wireless communication from a first candidate wireless station of the multiple candidate wireless stations; ii) receives a second wireless communication from a second candidate wireless station of the multiple candidate wireless stations; and so on.

A performance management resource associated with the primary wireless station produces performance information based on testing of the different backhauls. In one embodiment, the performance management resource is operable to: i) receive first performance information indicating an ability of the first candidate wireless station to convey wireless communications over a first candidate backhaul link between the first candidate wireless station and the primary wireless station; ii) receive second performance information indicating an ability of the second candidate wireless station to convey wireless communications over a second candidate backhaul link between the second candidate wireless station and the primary wireless station, and so on.

In one embodiment, the performance management resource (associated with the primary wireless station) is operable to utilize the first performance information and the second performance to rank the multiple candidate wireless stations based on capability. In one embodiment, the performance information indicates which of the multiple candidate wireless stations is best suited to provide a backhaul to the primary wireless station. Assume that the second candidate wireless station is best suited to provide a backhaul to the primary wireless station and that the second candidate wireless station is ranked higher in performance than the first candidate wireless station. In such an instance, in accordance with the performance information, a selection management resource associated with the primary wireless station is operable to select the second candidate wireless station to communicate with the remote network because it provides appropriate performance to convey data on behalf of the primary wireless station.

In accordance with yet further embodiments, a selection management resource associated with the primary wireless station is further operable to: receive performance information associated with the multiple candidate wireless stations, the performance information indicating an ability of each of the multiple candidate wireless stations to provide the primary wireless station connectivity to the remote network. The selection management resource associated with the wireless station utilizes the performance information as a basis to select an appropriate candidate wireless station from the multiple candidate wireless stations.

Note that the performance of the different candidate wireless stations and corresponding backhauls can be measured in any suitable manner. In one embodiment, the performance management resource associated with the primary wireless station is operable to: communicate to and through a first candidate wireless station of the multiple candidate wireless stations to test an ability of a first wireless backhaul communication link to convey wireless communications; and communicate to and through a second candidate wireless station of the multiple candidate wireless stations to test an ability of a second wireless backhaul communication link to convey wireless communications.

In one embodiment, the performance management resource initially produces a listing of each of the multiple candidate wireless stations based on available wireless bandwidth to support conveyance of data throughput. If desired, the performance evaluation resource (performance management resource) can be configured to update the performance information associated with the multiple candidate wireless stations in response to detecting a change in performance associated with the multiple candidate wireless stations.

Further embodiments herein include a management resource. Subsequent to establishing a backhaul link with the selected candidate wireless station, a configuration management resource associated with a primary wireless station provides notification of the selected candidate wireless station to a central server tracking use of network resources in the network environment.

Embodiments herein are useful over conventional techniques. For example, dynamic selection of a respective backhaul link amongst multiple available backhaul links as described herein ensures that the primary wireless station has the ability to provide one or more communication devices wireless an appropriate level of wireless services.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications in a network environment via dynamic selection of an appropriate backhaul link. The instructions, when executed by computer processor hardware, cause the computer processor hardware (such as one or more co-located or disparately processor devices) to: detect presence of multiple candidate wireless stations in a network environment, each respective wireless station of the multiple candidate wireless stations being available to support a wireless backhaul link from the primary wireless station to a remote network; select a candidate wireless station amongst the multiple candidate wireless stations to connect to the remote network; and utilize the selected candidate wireless station to establish the wireless backhaul link to the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating generation of performance information associated with multiple candidate backhauls according to embodiments herein.

Figure 1:
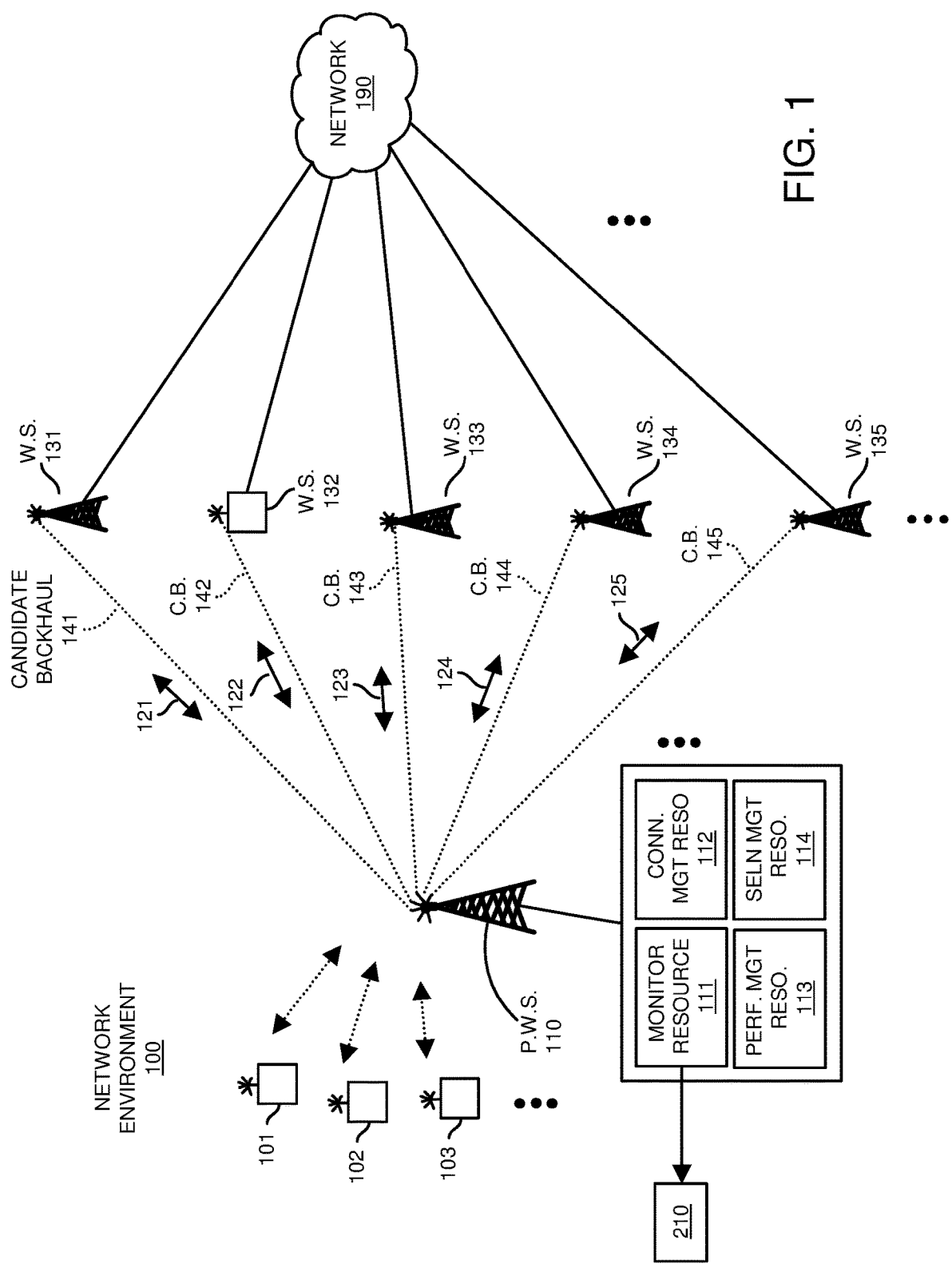
FIG. 1 is an example diagram illustrating a wireless network environment and availability of multiple candidate backhaul links according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a wireless communication system includes a primary wireless station, multiple candidate wireless stations, and a remote network. The primary wireless station is in communication with one or more of the multiple candidate wireless stations. During operation, when the primary wireless station needs to provide, or is providing, one or more communication devices access to a remote network, the primary wireless station monitors presence of multiple candidate wireless stations. Each of the multiple candidate wireless stations is available to support a wireless backhaul link from the primary wireless station to a remote (such as a core) network.

Based on a performance of each of the can backhauls, the primary wireless station selects an appropriate candidate wireless station amongst the multiple candidate wireless stations. Via a communication interface of the primary wireless station to the selected candidate wireless station, the primary wireless station establishes a backhaul link to the remote network.

Now, more specifically, FIG. 1 is an example diagram illustrating a wireless network environment and availability of multiple candidate backhauls according to embodiments herein.

As shown, network environment 100 includes a primary wireless station 110, multiple candidate wireless stations such as 131, wireless station 132, wireless station 133, wireless station 134, wireless station 135, etc., (in which to establish a backhaul communication link), and a remote network 190.

As previously discussed, in one embodiment, the resources (such as monitor resource 111, connection management resource 112, performance management resource 113, and selection management resource 114) associated with primary wireless station 110 facilitate dynamic selection of an appropriate backhaul link between the primary wireless station 110 in the network 190.

Note that any of the resources as described herein includes hardware or software resources (or a combination of both) in which to dynamically select an appropriate backhaul for use by a respective primary wireless station 110. In other words, each of the resources as discussed herein can be configured as hardware and/or software. As a more specific example, the monitor resource 111 associated with the primary wireless station 110 can be configured as monitor hardware and/or monitor software; the connection management resource 112 associated with the primary wireless station 110 can be configured as connection management hardware and/or connection management software; performance management resource 113 associated with the primary wireless station 110 can be configured as performance management hardware and/or performance management software; selection management resource 114 associated with the primary wireless station 110 can be configured as selection management hardware and/or selection management software; etc.

Note further that each of the resources associated with the primary wireless station 120 can be located any suitable location. For example, any of the resources such as monitor resource 111, connection management resource 112, performance management resource 113, selection management resource 114, etc., can be located at the primary wireless station 110. Alternatively, any of the resources such as monitor resource 111, connection management resource 112, performance management resource 113, selection management resource 114, etc., can be disparately located with respect to the primary wireless station 110.

Each of the multiple candidate wireless stations can be configured to support a different wireless communication protocol, different carrier frequency, etc., to support wireless communications over a selected backhaul communication link established with the primary wireless station 110.

For example, in one embodiment, the wireless station 131 can be configured to support LTE (Long Term Evolution) wireless communications in a CBRS (Citizens Band Radio System) environment; wireless station 132 can be configured to support Wi-Fi™ communications; wireless station 133 can be configured to support a proprietary wireless link such as an operator's fixed (proprietary) network radio; wireless station 134 can be configured to be a small cell base station supporting 5G NR (New Radio) communications; wireless station 135 can be configured as an available partner radio leased by a service provider operating the primary wireless station 110.

The primary wireless station 110 can be configured to include a wireless interface to communicate with each of the different wireless stations. For example, in one embodiment, the primary wireless station 110 includes a first wireless interface (such as wireless receiver and transmitter pair) supporting a first wireless communication protocol (such as LTE communications) to communicate with the wireless station 131; the primary wireless station 110 includes a second wireless interface (such as wireless receiver and transmitter pair) supporting a second wireless communication protocol (such as WiFi™ communications) to communicate with the wireless station 132; the primary wireless station 110 includes a third wireless interface (such as wireless receiver and transmitter pair) supporting a third wireless communication protocol (such as a service provider's proprietary communications protocol) to communicate with the wireless station 133; the primary wireless station 110 includes a fourth wireless interface (such as wireless receiver and transmitter pair) supporting a fourth wireless communication protocol (such as 5G NR communications) to communicate with the wireless station 134; the primary wireless station 110 includes a fifth wireless interface (such as wireless receiver and transmitter pair) supporting a fifth wireless communication protocol (such as associated with a partner radio network) to communicate with the wireless station 135; and so on.

As further shown, the primary wireless station 110 is potentially in communication with one or more of the multiple candidate wireless stations 131, 132, 133, etc. To select a backhaul and provide one or more communication devices 101, 102, 103, etc., access to a remote network 190, the monitor resource 111 associated with primary wireless station 110 monitors for presence of the multiple candidate wireless stations.

Monitoring of presence of the multiple candidate wireless stations can occur in any suitable manner. For example, the monitor resource 111 can be configured to generate one or more discovery requests according to one or more different protocols supported by the different candidate wireless stations present in network environment 100. Transmission of the discovery requests in the network environment 100 prompts any wireless stations to respond with presence information such as identity information of the available resource.

Additionally, or alternatively, the primary wireless station 110 can be configured to passively listen for presence of one or more general broadcast beacons indicating presence and/or availability of the different wireless stations in network environment 100.

Any of one or more of the wireless stations in network environment 100 can be configured to broadcast respective beacons on a regular basis in order to provide notification of their presence.

In one embodiment, the wireless station 132 has one or more hidden SSID (Service Set IDentifier) values that are provisioned to support backhaul services with a defined quality of service.

In one embodiment, each of the multiple candidate wireless stations 131, 132, 133, 134, 135, etc., is available to support a wireless backhaul link from the primary wireless station 110 to remote network 190. In certain instances, one or more of the wireless stations is unavailable.

In accordance with further embodiments, as previously discussed, the monitor resource 111 of the primary wireless station 110 monitors the network environment 100 for available candidate wireless stations. According to one configuration, when monitoring the network environment for candidate wireless stations, the monitor resource 111: i) receives a first wireless communication from candidate wireless station 131 of the multiple candidate wireless stations; ii) receives a second wireless communication from the candidate wireless station 132 of the multiple candidate wireless stations; iii) receives a third wireless communication from candidate wireless station 133 of the multiple candidate wireless stations; iv) receives a fourth wireless communication from candidate wireless station 134 of the multiple candidate wireless stations; v) receives a fifth wireless communication from the candidate wireless station 135 of the multiple candidate wireless stations; and so on.

In response to discovering the different available wireless stations, the monitor resource 111 produces the listing of candidate networks 210.

Referring again to FIG. 1, as further discussed below, the connection management resource 112 and performance management resource 113 individually establish and test each respective candidate backhaul link 141, 142, 143, 144, 145, etc., with a respective wireless station 131, 132, 133, 134, 135, etc., to determine performance capabilities.

In one embodiment, the tested parameters of a wireless backhaul include a round-trip time of conveying data packets over the backhaul, an amount of wireless bandwidth available to communicate over the backhaul, etc.

Based on the backhaul testing, the performance management resource 113 generates performance information indicating the different quality of services provided by the perspective backhauls.

Thereafter, the selection management resource 114 of the primary wireless station 110 is operable to select an appropriate candidate wireless station amongst the multiple candidate wireless stations based on the performance information generated by the performance management resource 113.

After selection of an appropriate backhaul, the primary wireless station 110 communicates using a respective communication interface to the selected candidate wireless station to establish a backhaul link to the remote network 190. Note that the link between the respective wireless station to network 190 can be wireless or a hard-wired link.

Figure 2:
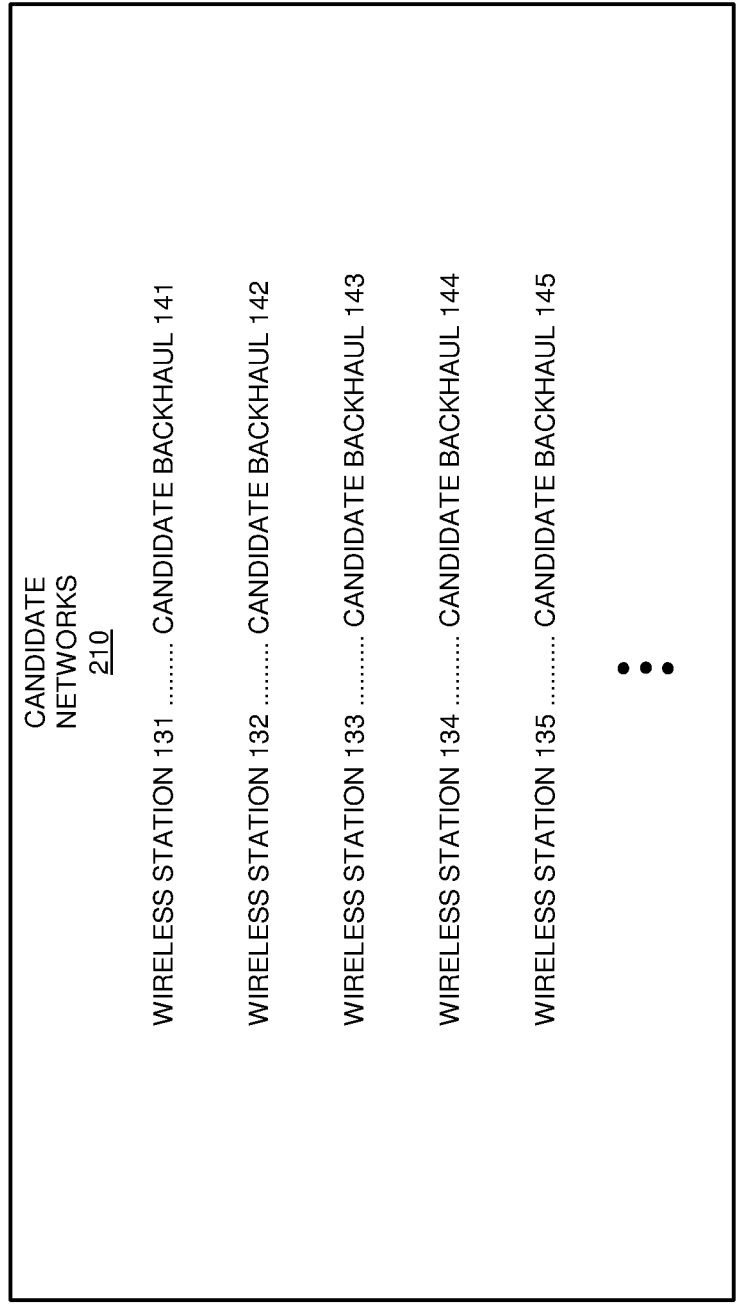
FIG. 2 is example diagram illustrating a listing of multiple detected wireless stations and corresponding candidate backhauls according to embodiments herein.

FIG. 2 is example diagram illustrating a listing of multiple detected wireless stations and corresponding candidate backhauls according to embodiments herein.

As shown, the listing of candidate networks 210 available for use by the primary wireless station 110 includes an identity of wireless station 131, wireless station 132, wireless station 133, wireless station 134, wireless station 135, etc.

Each wireless station supports one or more backhauls. In this example embodiment, wireless station 131 supports candidate backhaul 141; wireless station 132 supports candidate backhaul 142; wireless station 133 supports candidate backhaul 143; wireless station 134 supports candidate backhaul 144; wireless station 135 supports candidate backhaul 145; and so on.

As previously discussed, in one embodiment, prior to selecting an appropriate wireless station to establish a backhaul, the connection management resource 112 and performance management resource 113 perform an evaluation of each of the candidate backhauls available to the primary wireless station 110. Note that the process of evaluating the performance and availability of each of the candidate backhauls can occur at any suitable interval or time. For example, in one embodiment, the performance management resource 113 tests the performance capability of each of the candidate backhauls every 24 hours.

However, the candidate backhauls can be tested and retested at any time or for any reason.

For example, if the primary wireless station 110 experiences a failure of a currently used backhaul, prior to switchover and selection of a new backhaul, embodiments herein can include immediately testing each of the available remaining candidate backhauls to determine which of the available backhauls should be used to provide a backhaul between the primary wireless station 110 and the remote network 190.

In one embodiment, the performance management resource updates the performance information associated with the multiple candidate wireless stations in response to detecting a change in performance associated with one or more of the multiple candidate wireless stations. For example, in response to detecting a failure of a backhaul, the performance management resource can be configured to test the available backhauls again.

Figure 3:
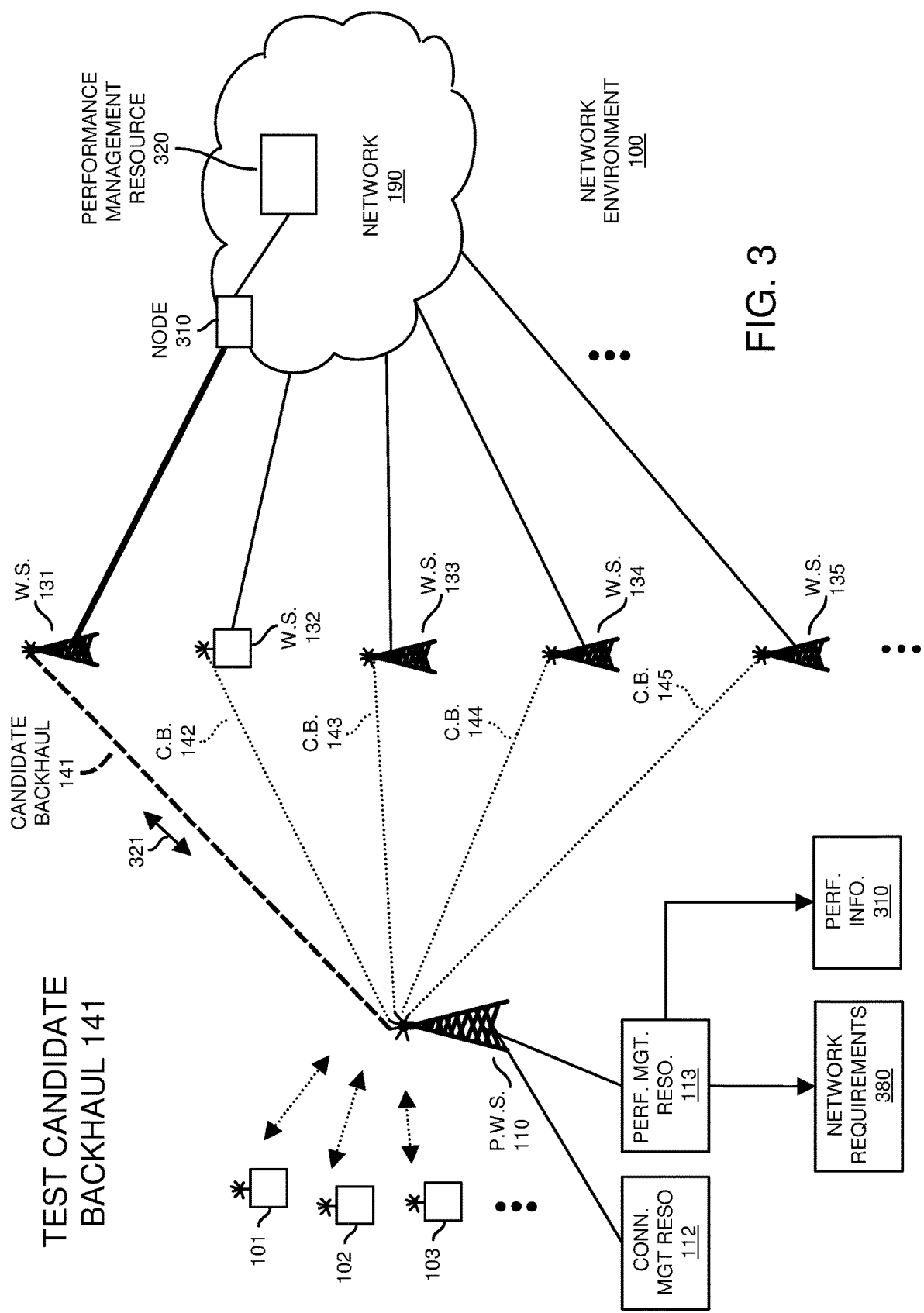
FIG. 3 is an example diagram illustrating testing of a first candidate backhaul according to embodiments herein.

FIG. 3 is an example diagram illustrating testing of a first candidate backhaul according to embodiments herein.

As previously discussed, the performance management resource 113 facilitates testing of each of the candidate backhauls. As further discussed below, each of the candidate backhauls can be individually tested at different times. Alternatively, one or more of the candidate backhauls can be tested simultaneously.

In one non-limiting example embodiment, to test the candidate backhaul 141, the connection management resource 112 associated with the primary wireless station 110 initiates communications with the wireless station 131. Prior to establishing a respective candidate backhaul link 141 for testing, the connection management resource 112 of the primary wireless station 110 provides appropriate credentials to the wireless station 131 (or other authentication resource such as in network 190) for authentication of the primary wireless station 110.

Subsequent to being authenticated, the connection management resource 112 of the primary wireless station 110 communicates with the wireless station 131 to establish or complete establishing the candidate backhaul 141 for testing.

Once established, the candidate backhaul 141 supports communications 321 between the primary wireless station 110 and the wireless station 131.

As further shown, the network 190 includes performance management resource 320 such as an iPerf™ client or any other suitable performance tester.

Note that the performance management resource 320 can be located anywhere in network environment 100. For example, the performance management resource 320 can be located in network 190, accessible through edge node 310. If desired, the performance management resource 320 can be located at an edge node of network 190, located at wireless station 131, etc.

In one embodiment, the performance management resource 113 initiates a performance evaluation of the candidate backhaul 141 (and additional backhaul link from the wireless station 131 to node 310) via transmission of one or more communications to the performance management resource 320 in network 190.

In one embodiment, the one or more communications 321 communicated to the performance management resource 320 notifies the performance management resource 320 to test the candidate backhaul link 141.

As previously discussed, the performance management resource 113 can initiate any of multiple different types of tests to test the candidate backhaul 141. In one embodiment, to initiate a round-trip time test, the performance management resource 113 of primary wireless station 110 communicates a ping message from the primary wireless station 110 over the candidate backhaul 141 through the wireless station 131 and node 310 to the performance management resource 320. The performance management resource 320 receives the ping message.

In response to receiving the ping message, the performance management resource 320 communicates a respective ping response through the node 310 and wireless station 130 over candidate backhaul 141 to the performance management resource 113 of the primary wireless station 110. To produce a round trip time value, the performance management resource 113 and/or the performance management resource 320 keep track of the round-trip time of communicating the initial ping message and receiving a respective ping response from the performance management resource 320.

One or more round-trip time values obtained during testing of the candidate backhaul 141 between the primary wireless station 110 and the performance management resource 320 are recorded in performance information 310.

If desired, this process of testing round-trip time can be repeated multiple times to produce an average round-trip time of transmitting data packets over the candidate backhaul 141 being tested. As further discussed below, the round-trip times provide a basis to evaluate the performance of the candidate backhaul 141. For example, lower round-trip times are typically preferred.

Further embodiments herein include testing a throughput capability (bandwidth) associated with the candidate backhaul 141.

In one embodiment, to test the ability to receive data packets in a downlink direction from the network 190 through wireless station 131 over candidate backhaul 141 to the primary wireless station 110, the performance management resource 113 communicates a bandwidth test command to the performance management resource 320.

In response to receiving the bandwidth test command, the performance management resource 320 communicates data packets from the performance management resource 320 through node 310 and wireless station 131 over the candidate backhaul 141 to the primary wireless station 110.

Figure 4:
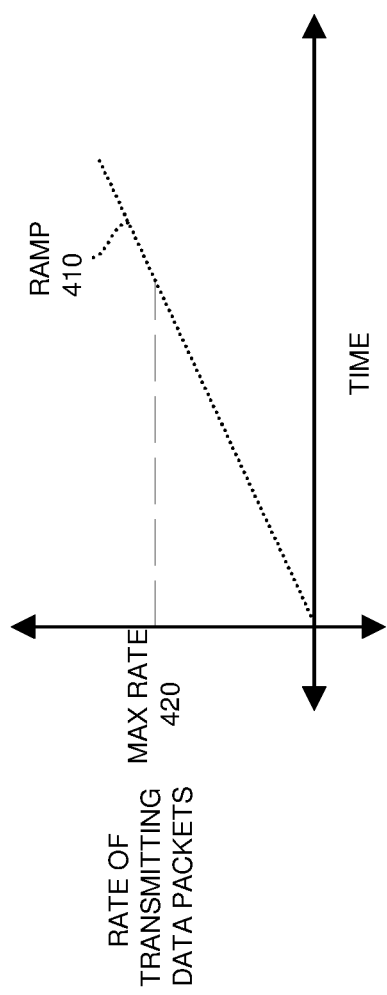
FIG. 4 is an example diagram illustrating ramping of transmitting data packets to test a first candidate backhaul according to embodiments herein.

In one embodiment, as further shown in FIG. 4, the performance management resource 320 can be configured to ramp a rate at which data packets are communicated through node 310 and wireless station 131 over the candidate backhaul 141 to the primary wireless station 110 to determine the maximum rate at which the candidate backhaul 141 can support conveyance of data packet communications.

The performance management resource 320 and/or the performance management resource to 113 keep track of a maximum rate 420 (threshold rate in FIG. 4) at which the performance management resource 320 is able to support downlink communications over the candidate backhaul 141 to the primary wireless station 110 without congestion.

Subsequent to determining the maximum available bandwidth rate, the performance management resource 113 stores the detected available downlink bandwidth rate for the candidate backhaul 141 being tested in performance information 310.

In a similar manner, the performance management resource 113 and performance management resource 320 can be configured to track the available uplink bandwidth rate associated with the candidate backhaul 141 being tested. This can include the performance management resource 113 tracking a rate of transmitting data packets in an uplink direction from the primary wireless station 110 over the candidate backhaul 141 through wireless station 131 and node 310 to the performance management resource 320.

After determining the maximum uplink rate, the performance management resource 113 stores the available uplink bandwidth rate for the candidate backhaul 141 being tested in performance information 310.

In this manner, the performance information 310 keeps track of round-trip time capability of communicating over the candidate backhaul 141 as well as uplink and downlink bandwidth available on the candidate backhaul 141.

Figure 5:
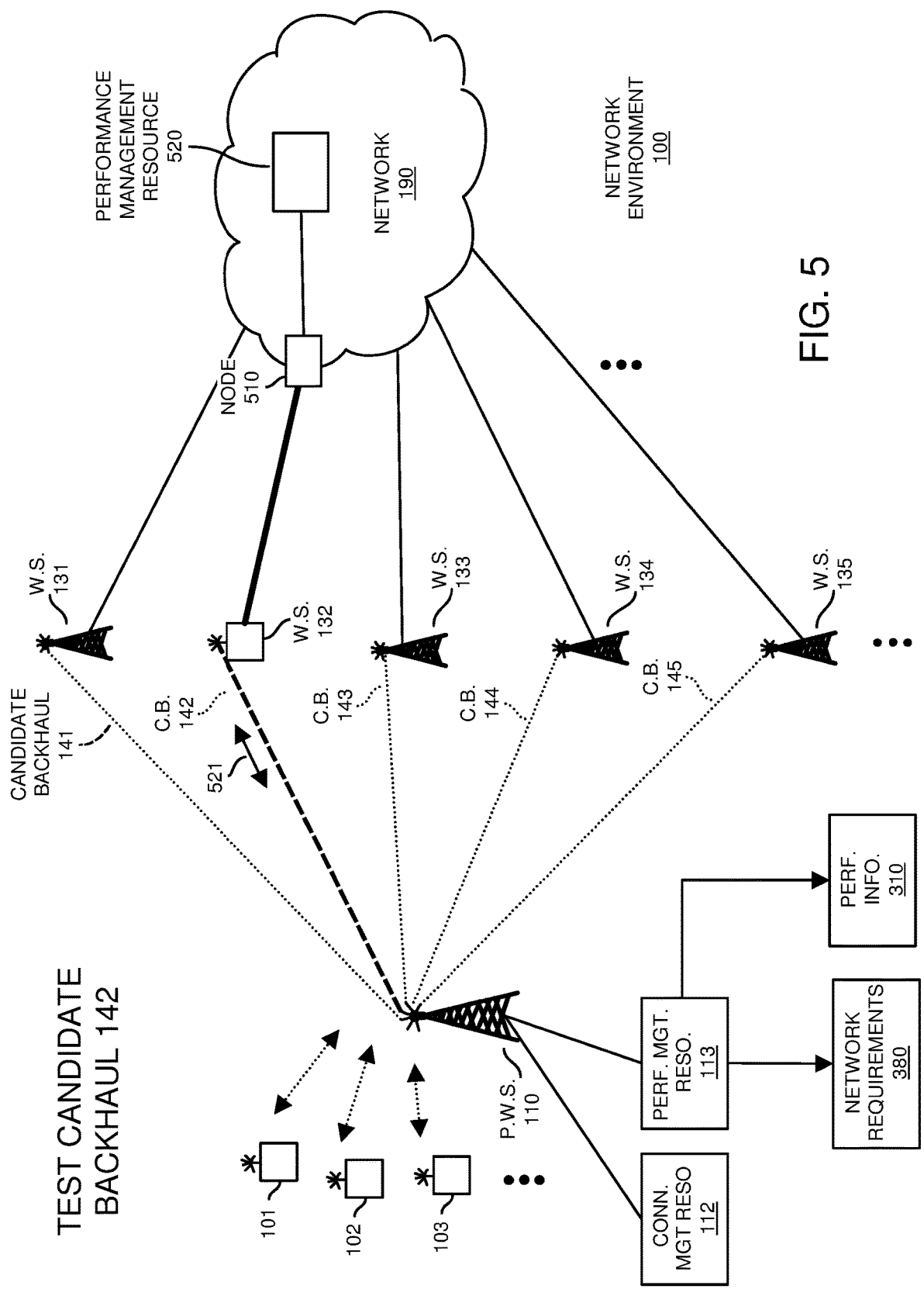
FIG. 5 is an example diagram illustrating testing of a second candidate backhaul according to embodiments herein.

FIG. 5 is an example diagram illustrating testing of a second candidate backhaul according to embodiments herein.

In one non-limiting example embodiment, to test the candidate backhaul 142, the connection management resource 112 associated with the primary wireless station 110 initiates communications with the wireless station 132. Prior to establishing a respective candidate backhaul link 142 for testing, the connection management resource 112 of the primary wireless station 110 provides appropriate credentials to the wireless station 132 (or other authentication management resource disposed in network 190) for authentication of the primary wireless station 110 and use of the backhaul 142.

Subsequent to being authenticated, the connection management resource 112 of the primary wireless station 110 communicates with the wireless station 132 to establish or complete establishing the candidate backhaul 142 link for testing.

Once established, the candidate backhaul 142 supports communications 521 between the primary wireless station 110 and the wireless station 132.

As further shown, the network 190 includes performance management resource 520 such as an iPerf™ client or other suitable performance evaluation resource.

Note that the performance management resource 520 can be located anywhere in network environment 100. For example, the performance management resource 520 can be located in network 190, accessible through edge node 510. If desired, the performance management resource 520 can be located at an edge node of network 190, located in wireless station 132, etc.

In one embodiment, the performance management resource 113 initiates a performance evaluation of the candidate backhaul 142 (and additional backhaul link from the wireless station 132 to node 510) via transmission of one or more communications to the performance management resource 520 in network 190. In one embodiment, the one or more communications 521 communicated to the performance management resource 520 notifies the performance management resource 520 to test the candidate backhaul link 142.

As previously discussed, the performance management resource 113 can initiate any of multiple different types of tests to test the candidate backhaul 142. In one embodiment, to initiate a round-trip time test, the performance management resource 113 communicates a ping message over the candidate backhaul 142 through the wireless station 132 and node 510 to the performance management resource 520. The performance management resource 520 receives the ping message.

In response to receiving the ping message, the performance management resource 520 communicates a respective ping response through the node 510 and wireless station 132 over candidate backhaul 142 to the performance management resource 113 of the primary wireless station 110. To produce a round trip time value, the performance management resource 113 and/or the performance management resource 520 keep track of the round-trip time of communicating the initial ping message and receiving a respective ping response from the performance management resource 520.

One or more round-trip time values obtained during testing of the wireless link between the primary wireless station 110 and the performance management resource 520 are recorded in performance information 310.

If desired, this process of testing round-trip time can be repeated multiple times to produce an average round-trip time of transmitting data packets over the candidate backhaul 142 being tested. As further discussed below, the round-trip times provide a basis to evaluate the performance of the candidate backhaul 142. For example, lower round-trip times are typically preferred.

Further embodiments herein include testing a throughput capability (bandwidth) associated with the candidate backhaul 142.

In one embodiment, to test the ability to receive data packets in a downlink direction from the network 190 through wireless station 132 over candidate backhaul 142 to the primary wireless station 110, the performance management resource 113 communicates a bandwidth test command to the performance management resource 520.

In response to receiving the bandwidth test command, the performance management resource 520 communicates data packets from the performance management resource 520 through node 510 and wireless station 132 over the candidate backhaul 142 to the primary wireless station 110.

In one embodiment, in a similar manner as previously discussed, the performance management resource 520 can be configured to ramp a rate at which data packets are communicated through node 510 and wireless station 132 over the candidate backhaul 142 to the primary wireless station 110 to determine the maximum rate at which the candidate backhaul 142 can support communications.

The performance management resource 520 and/or the performance management resource to 113 keep track of a maximum rate at which the performance management resource 520 is able to support communications over the candidate backhaul 142 to the primary wireless station 110 without congestion.

Subsequent to determining the maximum available bandwidth rate, the performance management resource 113 stores the detected available downlink bandwidth rate (a performance metric) for the candidate backhaul 142 being tested in performance information 510.

In a similar manner, the performance management resource 113 and performance management resource 520 can be configured to track the available uplink bandwidth rate associated with the candidate backhaul 142. This can include the performance management resource 113 tracking a rate of transmitting data packets in an uplink direction from the primary wireless station 110 over the candidate backhaul 142 through wireless station 131 and node 510 to the performance management resource 520.

After determining the maximum uplink rate, the performance management resource 113 stores the available uplink bandwidth rate for the candidate backhaul 142 being tested in performance information 310.

In this manner, the performance information 310 keep track of round-trip time capability of communicating over the candidate backhaul 142 as well as uplink and downlink bandwidth available on the candidate backhaul 142.

Figure 6:
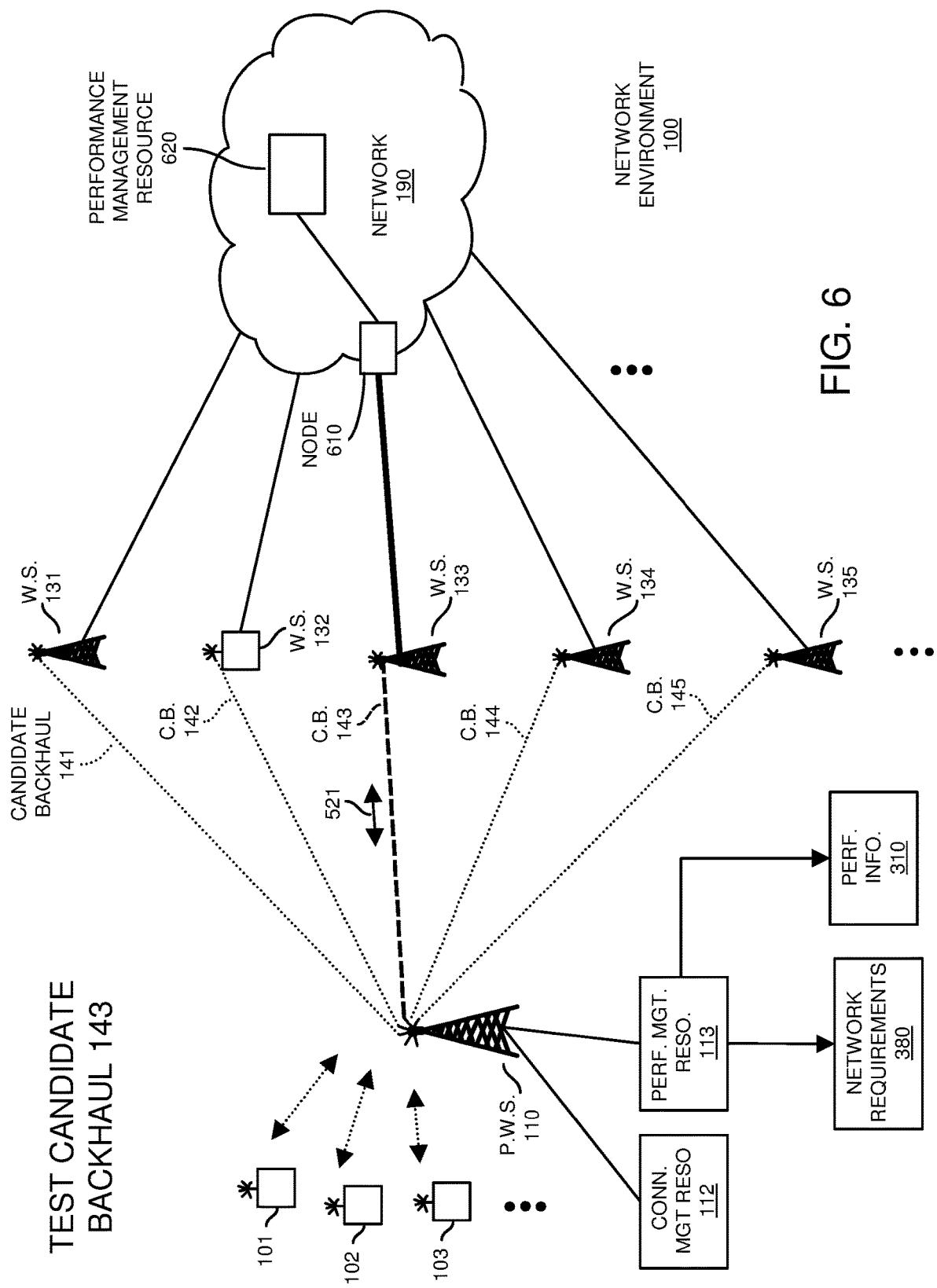
FIG. 6 is an example diagram illustrating testing of a third candidate backhaul according to embodiments herein

FIG. 6 is an example diagram illustrating testing of a third candidate backhaul according to embodiments herein In one non-limiting example embodiment, to test the candidate backhaul 143, the connection management resource 112 associated with the primary wireless station 110 initiates communications with the wireless station 133.

Prior to establishing a respective candidate backhaul link 143 for testing, the connection management resource 112 of the primary wireless station 110 provides appropriate credentials to the wireless station 133 (or other authentication management resource disposed in network 190) for authentication of the primary wireless station 110 and use of the backhaul 143.

Subsequent to being authenticated, the connection management resource 112 of the primary wireless station 110 communicates with the wireless station 133 to establish or complete establishing the candidate backhaul 143 link for testing.

Once established, the candidate backhaul 143 supports communications 621 between the primary wireless station 110 and the wireless station 133.

As further shown, the network 190 includes performance management resource 620 such as an iPerf™ client or other suitable performance evaluation resource.

Note that the performance management resource 620 can be located anywhere in network environment 100. For example, the performance management resource 620 can be located in network 190, accessible through edge node 610. If desired, the performance management resource 620 can be located at an edge node of network 190, located in wireless station 133, etc.

In one embodiment, the performance management resource 113 initiates a performance evaluation of the candidate backhaul 143 (and additional backhaul link from the wireless station 133 to node 610) via transmission of one or more communications to the performance management resource 620 in network 190. In one embodiment, the one or more communications 621 communicated to the performance management resource 620 notifies the performance management resource 620 to test the candidate backhaul link 143.

As previously discussed, the performance management resource 113 can initiate any of multiple different types of tests to test the candidate backhaul 143. In one embodiment, to initiate a round-trip time test, the performance management resource 113 communicates a ping message over the candidate backhaul 143 through the wireless station 133 and node 610 to the performance management resource 620. The performance management resource 620 receives the ping message.

In response to receiving the ping message, the performance management resource 620 communicates a respective ping response through the node 610 and wireless station 133 over candidate backhaul 143 to the performance management resource 113 of the primary wireless station 110. To produce a round trip time value, the performance management resource 113 and/or the performance management resource 620 keep track of the round-trip time of communicating the initial ping message and receiving a respective ping response from the performance management resource 620.

One or more round-trip time values obtained during testing of the link between the primary wireless station 110 and the performance management resource 620 are recorded in performance information 310.

If desired, this process of testing round-trip time can be repeated multiple times to produce an average round-trip time of transmitting data packets over the candidate backhaul 143 being tested. As further discussed below, the round-trip times provide a basis to evaluate the performance of the candidate backhaul 143. For example, lower round-trip times are typically preferred.

Further embodiments herein include testing a throughput capability (bandwidth) associated with the candidate backhaul 143.

In one embodiment, to test the ability to receive data packets in a downlink direction from the network 190 through wireless station 133 over candidate backhaul 143 to the primary wireless station 110, the performance management resource 113 communicates a bandwidth test command to the performance management resource 620.

In response to receiving the bandwidth test command, the performance management resource 620 communicates data packets from the performance management resource 620 through node 610 and wireless station 133 over the candidate backhaul 143 to the primary wireless station 110.

In one embodiment, in a similar manner as previously discussed, the performance management resource 620 can be configured to ramp a rate at which data packets are communicated through node 610 and wireless station 133 over the candidate backhaul 143 to the primary wireless station 110 to determine the maximum rate at which the candidate backhaul 143 can support communications.

The performance management resource 620 and/or the performance management resource to 113 keep track of a maximum rate at which the performance management resource 620 is able to support communications over the candidate backhaul 143 to the primary wireless station 110 without congestion.

Subsequent to determining the maximum available bandwidth rate, the performance management resource 113 stores the detected available downlink bandwidth rate for the candidate backhaul 143 being tested in performance information 310.

In a similar manner, the performance management resource 113 and performance management resource 620 can be configured to track the available uplink bandwidth rate associated with the candidate backhaul 143. This can include the performance management resource 113 tracking a rate of transmitting data packets in an uplink direction from the primary wireless station 110 over the candidate backhaul 143 through wireless station 133 and node 610 to the performance management resource 620. After determining the maximum uplink rate for candidate backhaul 143, the performance management resource 113 stores the available uplink bandwidth rate for the candidate backhaul 143 being tested in performance information 310.

In this manner, the performance information 310 keeps track of round-trip time capability of communicating over the candidate backhaul 143 as well as uplink and downlink bandwidth available on the candidate backhaul 143.

FIG. 7 is an example diagram illustrating generation of performance information associated with multiple candidate backhauls according to embodiments herein.

In this example embodiment, the performance information 310 indicates the different available uplink and downlink bandwidth capability and transmit time capability associated with the respective candidate backhauls as produced by the performance management resource 112. As previously discussed, the testing of different available backhauls can be performed at any time, as needed, to keep the performance information 310 up to date.

Figure 8:
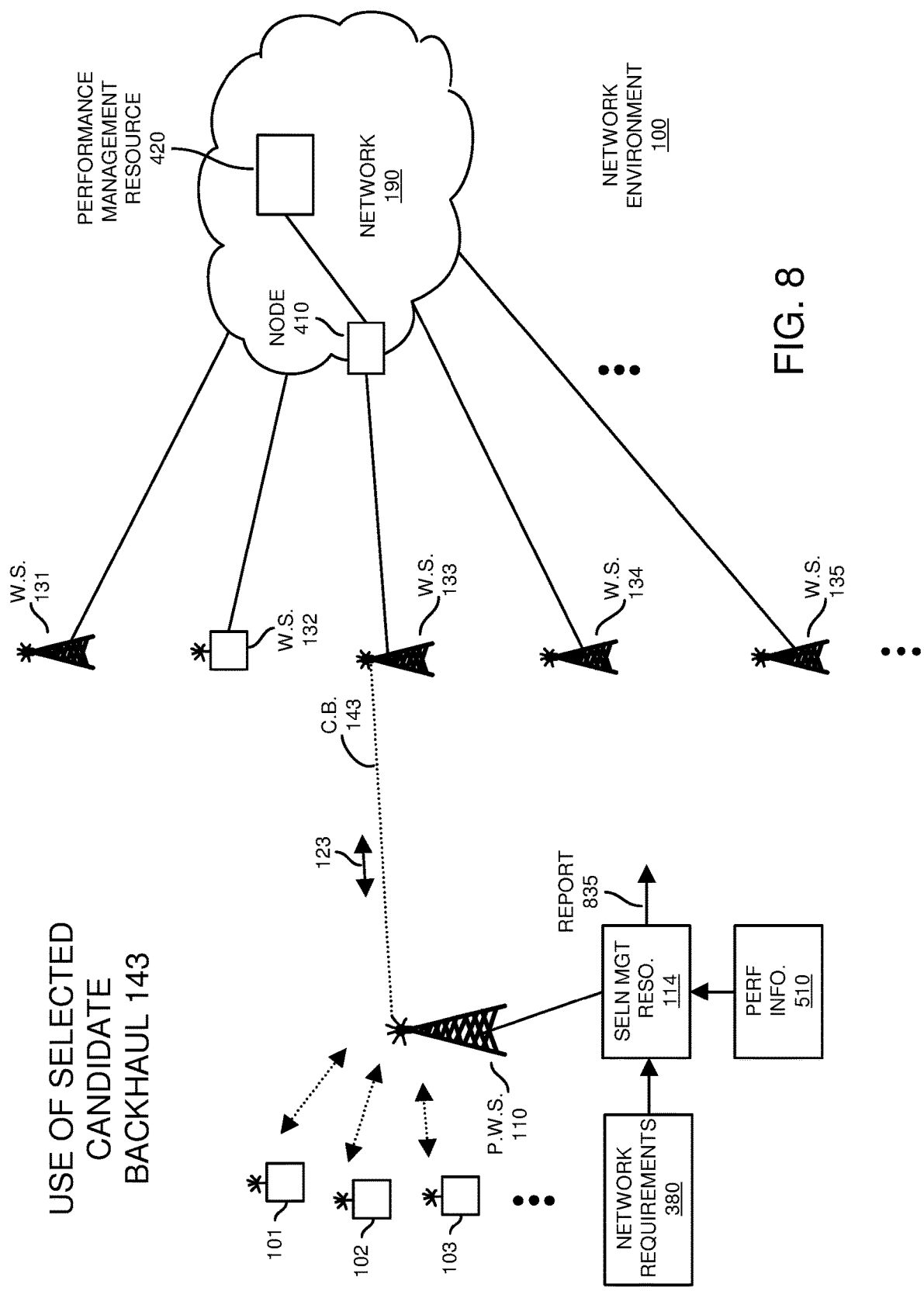
FIG. 8 is an example diagram illustrating use of a selected candidate backhaul according to embodiments herein.

FIG. 8 is an example diagram illustrating use of a selected candidate backhaul according to embodiments herein.

As previously discussed, network requirements 380 indicates the level of wireless capability needed to support wireless connectivity with mobile communication devices 101, 102, 103, etc., at a desired level of quality.

Based on network requirements 380, the selection management resource 114 uses the performance information 510 to select a corresponding candidate backhaul link and corresponding wireless station to provide conductivity of the primary wireless station 110 to the network 190.

In this example embodiment, assume that the primary wireless station 110 needs to support a high-bandwidth with a low latency as indicated by the network requirements 380. More specifically, assume that the primary wireless station 110 needs to support a downlink data rate of 90 MB (MegaBytes) per second, an uplink data rate of 40 MB per second, and a maximum latency of data packets being around 25 mS (milliseconds).

In such an instance, the selection management resource 114 analyzes the performance information 310 based on the prior backhaul testing. In this example embodiment, the selection management resource 114 selects use of the candidate backhaul 143 and corresponding wireless station 133 because of its ability to provide a proper downlink bandwidth of 100 MB per second, uplink bandwidth of 40 MB per second, and a latency of 15 mS. In other words, the selected candidate backhaul 143 provides the required level of service or better for each of the parameters.

In accordance with another example embodiment, assume that the primary wireless station 110 needs to support a low-bandwidth data link with a high latency as indicated by the network requirements 380. More specifically, assume that the primary wireless station 110 needs to support a downlink data rate of 10 MB (MegaBytes) per second, an uplink data rate of 10 MB per second, and a maximum latency of data packets being around 300 mS (milliseconds).

In such an instance, the selection management resource 114 analyzes the performance information 310 based on the prior backhaul testing. In this example embodiment, the selection management resource 114 can be configured to select any of the candidate backhaul for use. For example, candidate backhaul 144 and corresponding wireless station 134 provide a proper downlink bandwidth of 10 MB per second, uplink bandwidth of 15 MB per second, and a latency of 250 mS. In other words, the selected candidate backhaul 144 (or backhauls 141, backhaul 142, backhaul 143) provides the required level of service or better for each of the parameters.

Note that further embodiments herein include a management resource to provide notification of the selection to a remote resource tracking use of network environment 100 and corresponding resources. For example, in one embodiment, subsequent to selecting and establishing a backhaul link 143 with the selected candidate wireless station 133, the management resource associated with the primary wireless station 110 provides notification (such as report 835) of the selected candidate wireless station 133 and backhaul 143 to a central server tracking use of network resources in the network environment 100.

Note again that embodiments herein are useful over conventional techniques. For example, dynamic selection of a respective backhaul link amongst multiple available backhaul links based on current and/or updated performance capability as described herein ensures that the primary wireless station 110 has the ability to provide one or more communication devices 101, 102, 103, etc., wireless services according to an appropriate level quality required by the devices.

If desired, in one embodiment, the performance management resource (associated with the primary wireless station) is operable to utilize the performance information associated with each of the wireless stations and backhauls to rank the multiple candidate wireless stations based on performance. In such an instance, the performance information indicates which of the multiple candidate wireless stations provides the best capability. In such an instance, the performance information 310 would indicate that wireless station 133 and backhaul 143 provide the highest available performance; wireless station 131 and corresponding backhaul 141 provide the second highest available performance; and so on.

If desired, the selection management resource 114 can be configured to select a wireless station that is best suited to provide a backhaul to the primary wireless station 110.

In one embodiment, to use a respective wireless station, the selection management resource selects an appropriate communication interface of the multiple available wireless interfaces to communicate with the selected candidate wireless station to access the core network 190.

Figure 9:
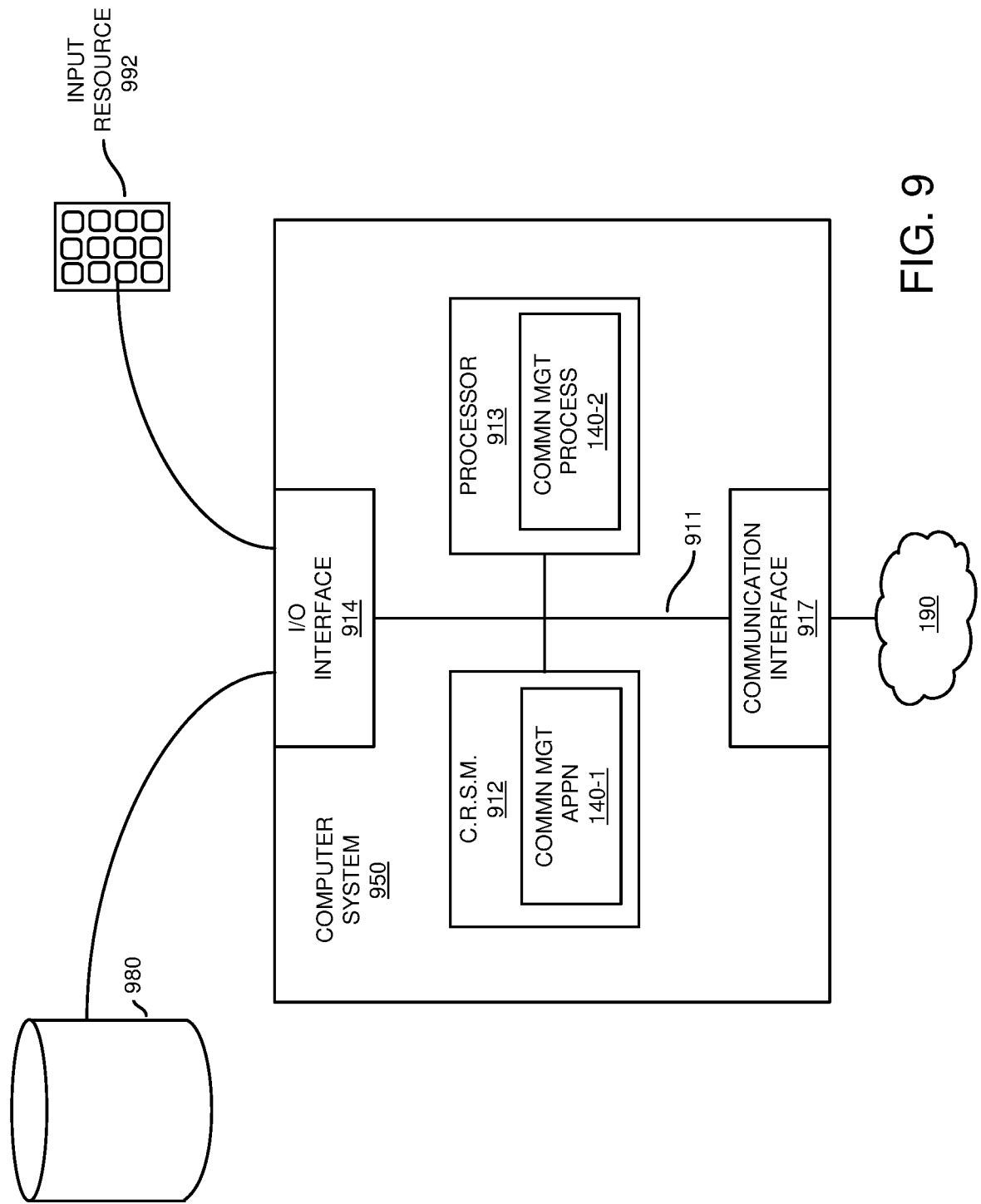
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as monitor resource 111, connection management resource 112, performance management resource 113, selection management resource 114, primary wireless station 110, wireless station 131, wireless station 132, . . . , performance management resource 320, performance management resource 520, performance management resource 620, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in communication with bank letters the check. For the bank account management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 10-11. Note that the steps in the flowcharts below can be executed in any suitable order.

Figure 10:
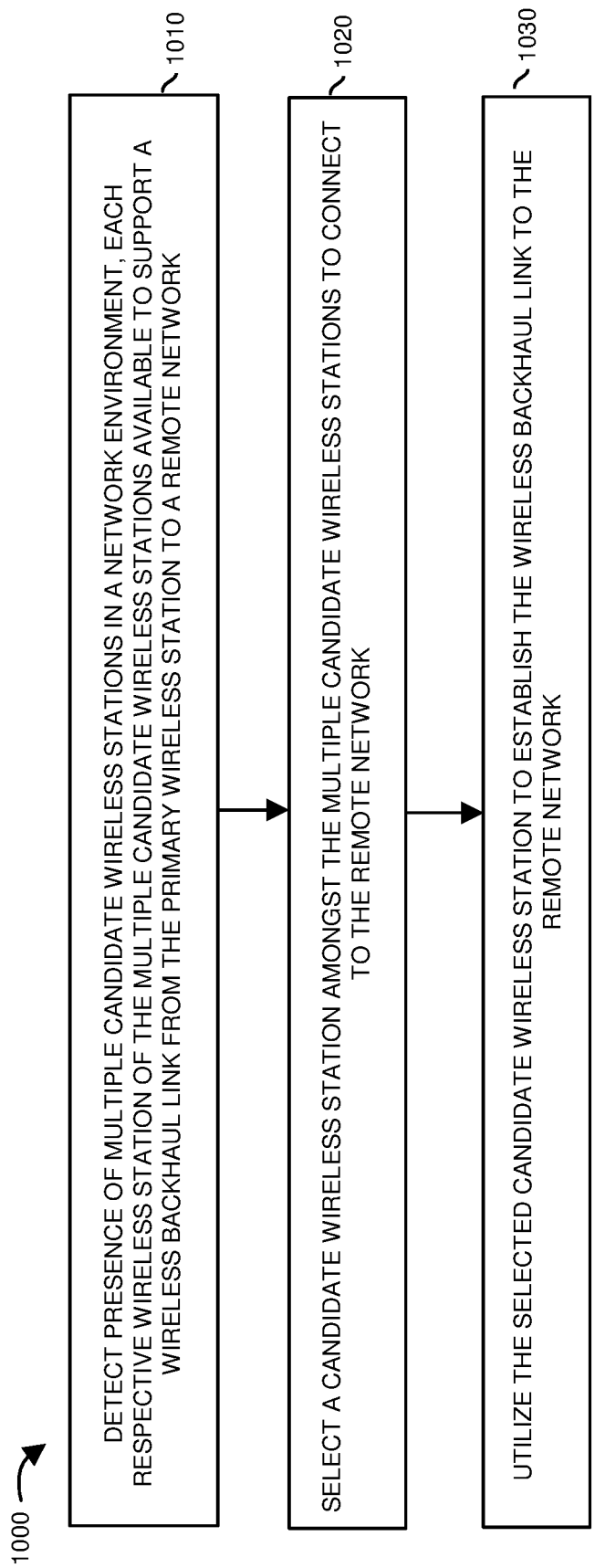
FIGS. 10-11 are example diagrams illustrating methods according to embodiments herein.

FIG. 10 is a flowchart 1000 illustrating an example method according to embodiments. Note that there will be some overlap with respect to concepts as discussed above.

In processing operation 1010, the monitor resource 111 detects presence of multiple candidate wireless stations 131, 132, 133, etc., in a network environment 100. Each respective wireless station of the multiple candidate wireless stations is available to support a wireless backhaul link from the primary wireless station 110 to a remote network such as network 190.

In processing operation 1020, selection management resource 114 selects a candidate wireless station amongst the multiple candidate wireless stations to connect to the remote network such as network 190.

In processing operation 1030, the wireless station 110 utilizes the selected candidate wireless station to establish the wireless backhaul link to the remote network.

Figure 11:
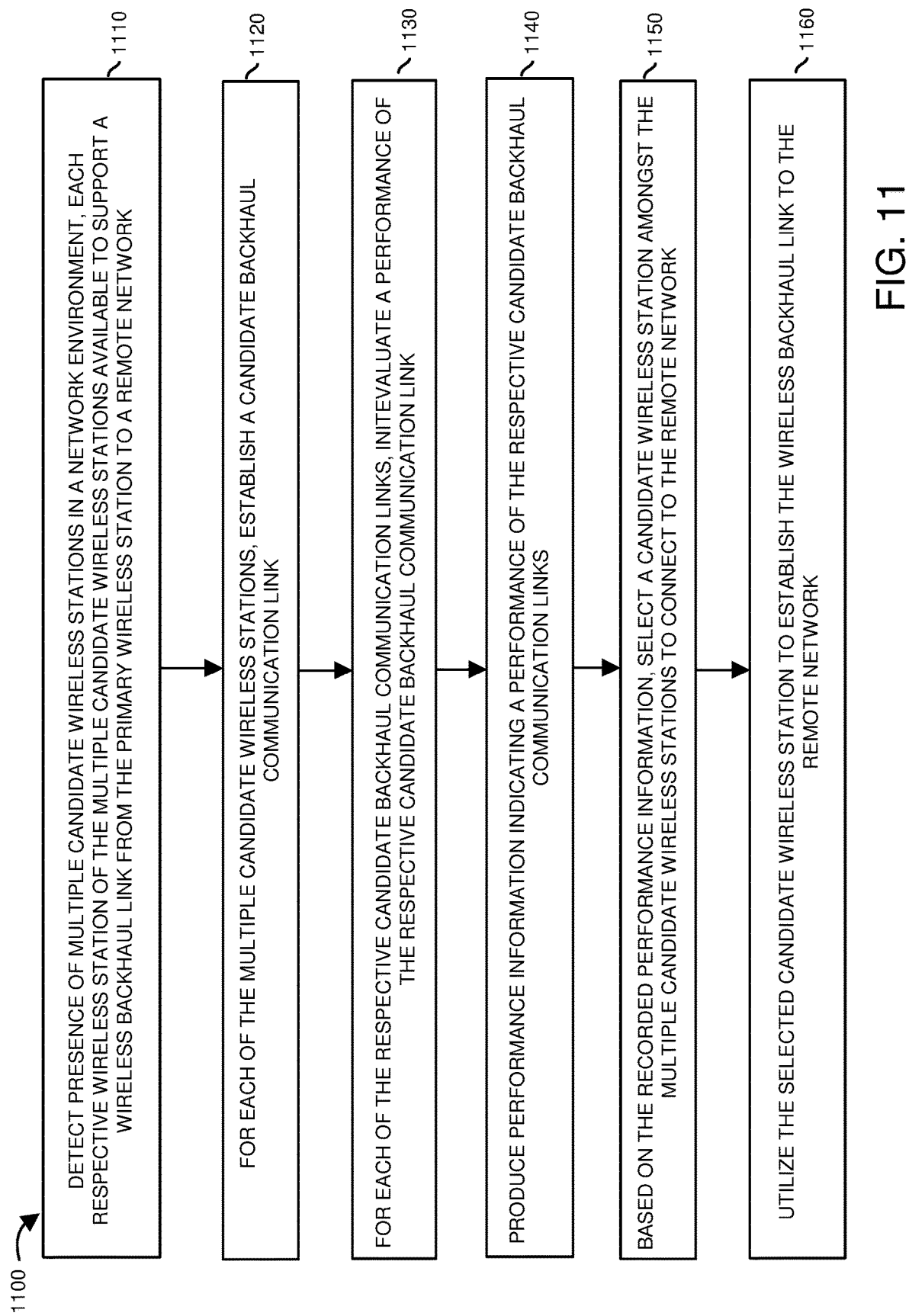

FIG. 11 is a flowchart 1100 illustrating an example method according to embodiments. Note that there will be some overlap with respect to concepts as discussed above.

In processing operation 1110, monitor resource 111 detects presence of multiple candidate wireless stations (such as wireless station 131, wireless station 132, wireless station 133, wireless station 134, wireless station 135, etc.) in network environment 100. Each respective wireless station of the multiple candidate wireless stations is available to support a wireless backhaul link from the primary wireless station 110 to a remote network such as network 190.

In processing operation 1120, for each of the multiple candidate wireless stations, the connection management resource 112 establishes a connection with a respective wireless station via a candidate backhaul communication link.

In processing operation 1130, for each of the respective candidate backhaul communication links, the performance management resource 113 initiates execution of a performance evaluation.

In processing operation 1140, the performance management resource 113 produces performance information 710 indicating a performance of the respective candidate backhaul communication links.

In processing operation 1150, based on the recorded performance information 710, the selection management resource 114 selects a candidate wireless station amongst the multiple candidate wireless stations to connect the primary wireless station 110 to the remote network 190.

In processing operation 1160, the primary wireless station utilizes the selected candidate wireless station to establish the wireless backhaul link to the remote network 190.

Note again that techniques herein are well suited to facilitate dynamic selection of a backhaul link. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    detecting presence of multiple candidate wireless stations in a network environment, each respective wireless station of the multiple candidate wireless stations in wireless communication with a primary wireless station and available to support a corresponding wireless backhaul link to the primary wireless station;
    initiating testing of an ability of a first wireless backhaul communication link between the primary wireless station and a first candidate wireless station of the multiple candidate wireless stations to convey first test communications;
    initiating testing of an ability of a second wireless backhaul communication link between the primary wireless station and a second candidate wireless station of the multiple candidate wireless stations to convey second test communications;

selecting a candidate wireless station amongst the multiple candidate wireless stations to connect the primary wireless station to a remote network via a wireless backhaul connection; and establishing the wireless backhaul connection between the primary wireless station and the selected candidate wireless station, the wireless backhaul connection providing the primary wireless station access to the remote network through the selected candidate wireless station.

2. The method as in claim 1 further comprising:
from the primary wireless station:
communicating through the first candidate wireless station of the multiple candidate wireless stations to test the ability of the first wireless backhaul communication link between the first candidate wireless station and the primary wireless station to convey wireless communications; and
communicating through the second candidate wireless station of the multiple candidate wireless stations to test the ability of the second wireless backhaul communication link between the second candidate wireless station and the primary wireless station to convey wireless communications.

3. The method as in claim 2, wherein each of the multiple candidate wireless stations supports a different wireless communication protocol.

4. The method as in claim 1, wherein each of the multiple candidate wireless stations supports a different carrier frequency to convey communications over a communication link established with the primary wireless station.

5. The method as in claim 1 further comprising:
ranking each of the multiple candidate wireless stations based on available wireless bandwidth to convey communications to the primary wireless station; and
utilizing the ranking to select the candidate wireless station amongst the multiple candidate wireless stations.

6. The method as in claim 1, wherein the corresponding wireless backhaul links associated with the multiple candidate wireless stations are tested and verified as having sufficient available bandwidth above a threshold value prior to the selecting.

7. The method as in claim 1, wherein testing of the ability of the first wireless backhaul communication link includes varying a rate of transmitting the first test communications over the first wireless backhaul communication link; and
wherein testing of the ability of the second wireless backhaul communication link includes varying a rate of transmitting the second test communications over the second wireless backhaul communication link.

8. The method as in claim 7 further comprising:
identifying a first amount of available bandwidth in the first wireless backhaul communication link based on monitoring of the first test communications, the first amount of available bandwidth being greater than a threshold level of bandwidth needed by the primary wireless station;
identifying a second amount of available bandwidth in the second wireless backhaul communication link based on monitoring of the second test communications, the second amount of available bandwidth being greater than the threshold level of bandwidth needed by the primary wireless station; and wherein selecting the candidate wireless station amongst the multiple candidate wireless stations includes selecting the candidate wireless station from amongst the first candidate wireless station and the second candidate wireless station.

9. The method as in claim 8, wherein the first wireless backhaul communication link supports a different protocol than the second wireless backhaul communication link.

10. A method comprising:
detecting presence of multiple candidate wireless stations in a network environment, each respective wireless station of the multiple candidate wireless stations in wireless communication with a primary wireless station and available to support a corresponding wireless backhaul link to the primary wireless station;
selecting a candidate wireless station amongst the multiple candidate wireless stations to connect the primary wireless station to a remote network via a wireless backhaul connection; and
establishing the wireless backhaul connection between the primary wireless station and the selected candidate wireless station, the wireless backhaul connection providing the primary wireless station access to the remote network through the selected candidate wireless station;
wherein detecting presence of the multiple candidate wireless stations in the network environment includes:
receiving a first wireless communication, the first wireless communication received from a first candidate wireless station of the multiple candidate wireless stations, the first wireless communication indicating availability of the first candidate wireless station; and
receiving a second wireless communication, the second wireless communication received from a second candidate wireless station of the multiple candidate wireless stations, the second communication indicating availability of the second candidate wireless station.

11. The method as in claim 10 further comprising:
producing first performance information indicating an ability of the first candidate wireless station to convey wireless communications over a first candidate wireless backhaul link between the first candidate wireless station and the primary wireless station, the first performance information indicating that the first candidate wireless backhaul link provides a level of wireless backhaul service quality above a threshold level to the primary wireless station; and
producing second performance information indicating an ability of the second candidate wireless station to convey wireless communications over a second candidate wireless backhaul link between the second candidate wireless station and the primary wireless station, the second performance information indicating that the second candidate wireless backhaul link provides a level of wireless backhaul service quality above the threshold level to the primary wireless station.

12. The method as in claim 11 further comprising:
utilizing the first performance information and the second performance information to rank the multiple candidate wireless stations, the second candidate wireless station ranked higher in performance than the first candidate wireless station.

13. The method as in claim 11, wherein selecting the candidate wireless station amongst the multiple candidate wireless stations to connect to the network includes:
selecting the second candidate wireless station to communicate with the remote network based on detecting that the second performance information provides a level of wireless backhaul service quality above the threshold level to the primary wireless station.

14. A system comprising:
a primary wireless station in communication with multiple candidate wireless stations in a network environment, the primary wireless station including:
a communication management resource to:
i) detect presence of multiple candidate wireless stations in the network environment, each of the multiple candidate wireless stations available to support a corresponding wireless backhaul link with the primary wireless station,
ii) initiate testing of an ability of a first wireless backhaul communication link between the primary wireless station and a first candidate wireless station of the multiple candidate wireless stations to convey first test communications, and
iii) initiate testing of an ability of a second wireless backhaul communication link between the primary wireless station and a second candidate wireless station of the multiple candidate wireless stations to convey second test communications;
a selection management resource to select a candidate wireless station amongst the multiple candidate wireless stations to connect the primary wireless station to a core network; and
a communication interface to communicate with the selected candidate wireless station, the communication interface operable to establish a wireless backhaul connection between the primary wireless station and the selected candidate wireless station, the wireless backhaul connection providing the primary wireless station access to the core network through the selected candidate wireless station.

15. The system as in claim 14, wherein the primary wireless station is further operable to:
receive performance information associated with the multiple candidate wireless stations, the performance information indicating an ability of each of the multiple candidate wireless stations to provide the primary wireless station connectivity to the core network, the performance information indicating the first candidate wireless station and the second candidate wireless station of the multiple candidate wireless stations as being both able to provide a wireless backhaul service to the primary wireless station above a threshold level; and
utilize the performance information as a basis to select the candidate wireless station from the multiple candidate wireless stations.

16. The system as in claim 14, wherein the primary wireless station is further operable to:
communicate through the first candidate wireless station of the multiple candidate wireless stations to test an ability of the first wireless backhaul communication link between the first candidate wireless station and the primary wireless station to convey the first test communications; and
communicate through the second candidate wireless station of the multiple candidate wireless stations to test an ability of the second wireless backhaul communication link between the second candidate wireless station and the primary wireless station to convey the second test communications.

17. The system as in claim 14, wherein each of the multiple candidate wireless stations supports a different wireless communication protocol.

18. The system as in claim 14, wherein each of the multiple candidate wireless stations supports a different carrier frequency to convey communications over a communication link established with the primary wireless station.

19. The system as in claim 14 further comprising:
a performance evaluation resource operable to: rank each of the multiple candidate wireless stations based on available wireless bandwidth to convey communications to the primary wireless station;
wherein the primary wireless station is further operable to: i) utilize the ranking to select the candidate wireless station amongst the multiple candidate wireless stations; and ii) establish a wireless backhaul link with the selected candidate wireless station.

20. The system as in claim 14 further comprising:
a performance evaluation resource operable to:
produce a list indicating each of the multiple candidate wireless stations and available wireless bandwidth to support conveyance of data throughput; and
update the list of multiple candidate wireless stations in response to detecting a change in performance associated with the multiple candidate wireless stations.

21. A system comprising:
a primary wireless station in communication with multiple candidate wireless stations in a network environment, the primary wireless station including:
a communication management resource to detect presence of multiple candidate wireless stations in the network environment, each of the multiple candidate wireless stations available to support a corresponding wireless backhaul link with the primary wireless station;
a selection management resource to select a candidate wireless station amongst the multiple candidate wireless stations to connect the primary wireless station to a core network; and
a communication interface to communicate with the selected candidate wireless station, the communication interface operable to establish a wireless backhaul connection between the primary wireless station and the selected candidate wireless station, the wireless backhaul connection providing the primary wireless station access to the core network through the selected candidate wireless station;
wherein the primary wireless station is further operable to:
receive a first wireless communication from a first candidate wireless station of the multiple candidate wireless stations, the first wireless communication indicating availability of the first candidate wireless station; and
receive a second wireless communication from a second candidate wireless station of the multiple candidate wireless stations, the second wireless communication indicating availability of the second candidate wireless station.

22. The system as in claim 21, wherein the primary wireless station is further operable to:
receive first performance information indicating an ability of the first candidate wireless station to convey wireless communications over a first candidate wireless backhaul link between the first candidate wireless station and the primary wireless station, the first performance information indicating that the first candidate wireless backhaul link provides a suitable level of wireless backhaul service quality above a threshold level to the primary wireless station; and receive second performance information indicating an ability of the second candidate wireless station to convey wireless communications over a second candidate wireless backhaul link between the second candidate wireless station and the primary wireless station, the second performance information indicating that the second candidate wireless backhaul link provides an appropriate level of wireless backhaul service quality above the threshold level to the primary wireless station.

23. The system as in claim 22 further comprising:

a performance management resource operable to utilize the first performance information and the second performance information to rank the multiple candidate wireless stations, the second candidate wireless station ranked higher in performance than the first candidate wireless station.

24. The system as in claim 22 further comprising:

a selection management resource operative to select the second candidate wireless station to communicate with the core network based on detecting that the second performance information provides an appropriate level of wireless backhaul service quality above a threshold level to the primary wireless station.

25. The system as in claim 21, the primary wireless station is further operable to:

establish a first backhaul link between the primary wireless station and the first candidate wireless station;

communicate over the first backhaul link to test an ability of the first backhaul link to convey wireless communications;

establish a second backhaul link between the primary wireless station and the second candidate wireless station;

communicate over the second backhaul link to test an ability of the second candidate backhaul link to convey wireless communications; and select the candidate wireless station based on the ability of the first backhaul link to convey wireless communications and the ability of the second wireless station to convey wireless communications.

26. Computer-readable storage hardware having instructions stored thereon, the instructions, when carried out by computer processor hardware, cause the computer processor hardware to:

detect presence of multiple candidate wireless stations in a network environment, each respective wireless station of the multiple candidate wireless stations in wireless communication with a primary wireless station and available to support a wireless backhaul link from the primary wireless station to a remote network;

initiate testing of an ability of a first wireless backhaul communication link between the primary wireless station and a first candidate wireless station of the multiple candidate wireless stations to convey first test communications;

initiate testing of an ability of a second wireless backhaul communication link between the primary wireless station and a second candidate wireless station of the multiple candidate wireless stations to convey second test communications;

select a candidate wireless station amongst the multiple candidate wireless stations to connect the primary wireless station to the remote network; and establish a wireless backhaul connection between the primary wireless station and the selected candidate wireless station, the wireless backhaul connection providing the primary wireless station access to the remote network through the selected candidate wireless station.

\* \* \* \* \*

UNITED STATES PATENT AND TRADEMARK OFFICE
CERTIFICATE OF CORRECTION

PATENT NO. : 10,708,845 B2
APPLICATION NO. : 16/103662
DATED : July 7, 2020
INVENTOR(S) : Ahmed Bencheikh et al.

Page 1 of 1

It is certified that error appears in the above-identified patent and that said Letters Patent is hereby corrected as shown below:

In the Claims

Column 23, Line 28, after "Claim 21," insert --wherein--

Signed and Sealed this
Twenty-second Day of September, 2020

Andrei Iancu
*Director of the United States Patent and Trademark Office*